United States Patent Office 3,635,948
Patented Jan. 18, 1972

3,635,948
PREPARATION OF 7 - CHLORO-2,3-DIHYDRO-1-METHYL-5-PHENYL - 1H - 1,4-BENZODIAZEPINE FROM 2,3 - DIHYDRO-1-METHYL-5-PHENYL-1H-1,4-BENZODIAZEPINE BY CHLORINATION
Robert Ye-Fong Ning, Verona, and Leo Henryk Sternbach, Upper Montclair, N.J., assignors to Hoffmann-La Roche Inc., Nutley, N.J.
No Drawing. Filed June 4, 1968, Ser. No. 734,216
Int. Cl. C07d 53/04, 53/06
U.S. Cl. 260—239
7 Claims

ABSTRACT OF THE DISCLOSURE

7 - chloro-2,3-dihydro-1-methyl-5-phenyl-1H-1,4-benzodiazepine (A) from 2,3-dihydro-1-methyl-5-phenyl-1H-1,4-benzodiazepine by chlorination. (A) is useful as an anticonvulsant, muscle relaxant and sedative agent.

The present invention relates to the preparation of a compound of the formula

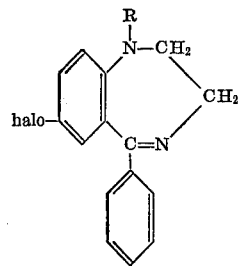

(I)

wherein R is lower alkyl from the corresponding compounds of the formula

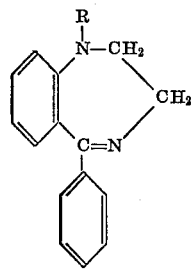

(II)

wherein R is as above by halogenating the latter with a halogenating agent. Preferably, the halogen group in position-7 of compounds of the Formula I above is chlorine.

Compounds of the Formula I are known prior to the present invention as being pharmaceutical agents by virtue of their pharmacological activity.

The process which constitutes the present invention comprises reacting a compound of the Formula II above with a halogenating agent selected from the group consisting of halogen, a lower alkyl hypohalite and a halogenating agent containing a

group wherein X is halogen, preferably selected from the group consisting of bromine and chlorine, most preferably chlorine.

When a halogen is utilized as the halogenating agent, preferred is the halogen chlorine.

When a lower alkyl hypohalite is utilized as the halogenating agent, preferred are lower alkyl hypochlorites such as tertiary butyl hypochlorite.

Preferred among the many halogenating agents which contain a

grouping and hence are employable in the process aspect of the invention disclosed herein are those selected from the group consisting of compounds of the formula

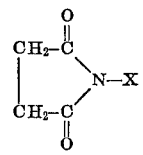

III-a a compound of the formula

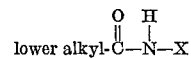

III-b and a compound of the formula

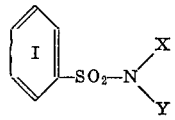

III-c wherein X is as above, I connotes unsubstitution or substitution and Y is selected from the group consisting of hydrogen and lower alkyl.

When I connotes substitution, preferably, it is indicative of a lower alkyl group. That is to say, that a lower alkyl group is positioned on the phenyl nucleus of the the compound of the Formula III–c above.

Illustrative of compounds within the genus encompassed by Formula III–a above, III–b above and III–c above are N-chlorosuccinimide, N-bromosuccinimide, N-halo-lower alkanoyl amides, e.g. N-chloroacetamide, N-chlorosulfonamides, such as chloroamine-B, chloroamine-T and the like.

When a compound containing the group

is utilized, a free radical catalyst may also be present in the reaction medium, although the presence of a free radical catalyst is not essential to a successful performance of the process aspect described herein. Any suitable free radical catalyst which possesses the capability of promoting halogenating in position-7 of the compounds of the Formula II above is included within the purview of the present invention. Illustrative of suitable catalysts are azo-bis-lower alkyl nitriles, such as azobis-isobutyronitrile and 2,2'-azobis-(2-methylpropionitrile), di-lower alkyl peroxides, such as di-t-butyl peroxides, di-acyl peroxides such as di-lower alkanoyl peroxides (e.g. acetyl peroxide), peresters such as t-butyl perbenzoate and t-butyl perphthalate, hydroperoxides such as t-butyl hydroperoxide and cumene hydroperoxide and the like. Preferred among the many free radical catalysts utilizable in the process aspects of the present invention are azo-bis-lower alkyl nitriles. A preferred combination of halogenating agent and free radical catalyst consists of a mixture containing N-chlorosuccinimide and 2,2'-azobis(2-methylpropionitrile).

In an advantageous aspect of the present invention, the conversion of a compound of the Formula II into the corresponding compound of the Formula I is effected utilizing an inert organic solvent as the reaction medium. Suitable solvent media are represented by a weak organic acid such as a lower alkanoic acid, e.g. acetic acid, formic acid and the like, a chlorinated hydrocarbon, such as chlorobenzene, carbon tetrachloride, methylene dichloride, chloroform and the like. When a lower alkanoic acid is utilized as the reaction medium, the reaction medium can be buffered by adding thereto a buffer such as potassium acetate, potassium carbonate, triethylamine and the like.

Suitably, when a halogen atom is utilized as the halogenating agent, the preferred solvent medium is a lower alkanoic acid.

When a lower alkyl hypohalite is utilized as the halogenating agent, the preferred solvent medium is a chlorinated hydrocarbon. Furthermore, when a halogenating agent containing the group

is utilized as the reagent which provides the halogen atom, a chlorinated hydrocarbon is most suitably employed as the medium in which the conversion of a compound of the Formula II into the corresponding compound of the Formula I is effected.

Temperature and pressure are not critical features of the above reaction. Thus, the reaction can be effected at room temperature and atmospheric pressure or above room temperature. It should be apparent to those skilled in the art that the temperature at which the conversion of the compound of the Formula II above into the corresponding compound of the Formula I above is effected is determined in part by the halogenating agent utilized. For example, if the reaction is conducted utilizing halogen, it is preferred to conduct the reaction at a temperature range of about 10° to about 40°, most preferably at room temperature.

When the lower alkyl hypochlorite or the agent containing the

grouping is utilized as the halogen providing agent, it is preferred to perform the reaction at elevated temperatures, e.g. at about the reflux temperature of the reaction medium in which the process is being conducted. Furthermore, should a free radical catalyst be present, it should be equally readily apparent to those skilled in the art that the temperature at which the conversion of a compound of Formula II above into the corresponding compound of the Formula I above is effected is determined in part by the free radical catalyst employed. It is well known that some radical formation which is caused by bond dissociation occurs at room temperature. Thus, with a free radical catalyst which dissociates at room temperature, the reaction may be conducted at such a temperature. Most free radical catalysts, however, dissociate at above room temperature. Thus, in the more preferred process aspect, should a free radical catalyst be present, it is preferential to conduct the reaction at elevated temperatures, again advantageously at about the reflux temperature of the reaction medium.

The term "lower alkyl" as utilized throughout the present specification is intended to connote $C_1$–$C_7$ branched and straight chain hydrocarbon radicals, such as methyl, ethyl, isopropyl, butyl and the like. In the most advantageous process aspect of the present invention, a compound of the Formula I wherein R is a methyl group are prepared.

Thus, the present invention relates to a novel and unique process of effecting the conversion of a compound bearing unsubstitution on the fused portion of a benzodiazepine nucleus into the corresponding compound which contains halogen thereat. In the most advantageous process aspect of the present invention, the halogenation is effected with an

containing halogenating agent, preferably, N-chlorosuccinimide. By utilizing N-chlorosuccinimide there is obtained the highest yields of the compound of the Formula I from the corresponding compound of the Formula II above.

The following examples are illustrative but not limitative of the present invention. All temperatures specified in the disclosure in the sepcification are in degrees centigrade.

EXAMPLE 1

A solution of 100 mg. (0.423 mmole) of 2,3-dihydro-1-methyl-5-phenyl-1H - 1,4 - benzodiazepine and 60.2 mg. (0.45 mmole) of N-chlorosuccinimide in 3 ml. of methylene chloride was heated to a gentle reflux under nitrogen for 21 hr. Solvent was evaporated in vacuo. The residue was triturated five times with 5 ml. portions of ether. The combined ether extracts were filtered through a plug of cotton, then washed three times with 15 ml. portions of water to remove last traces of succinimide. Drying over anhydrous sodium sulfate followed by evaporation of ether gave a yellow gum, which was flask distilled at 200° (0.02 mm.). The resulting medium was separated on a 20 cm. x 20 cm. x 2 mm. silica gel plate using ethyl acetate as eluent. The yellow band was scraped off the plate and eluted with 5 percent methanol in ethyl acetate. The eluent was evaporated off and the oil which was obtained thusly was replated on two more of the same plates. Elution this time gave a crystalline material which after recrystallizations from hexane gave 7-chloro-2,3-dihydro-1-methyl-5-phenyl-1H-1,4-benzodiazepine as faintly yellow prisms, M.P. 99–100°.

EXAMPLE 2

7-chloro-2,3-dihydro-1-methyl-5-phenyl-1H - 1,4 - benzodiazepine was prepared from 2,3-dihydro-1-methyl-5-phenyl-1H-1,4-benzodiazepine utilizing the following materials and reaction conditions:

| | | | | Conditions | | | | | | | |
|---|---|---|---|---|---|---|---|---|---|---|---|
| Example | Chlorinating agent | Mole equiv. | Solvent | Conc. rel. to substrate, M | Buffer | Mole equiv. | Free radical catalyst [1] | Weight percent | Temperature | Time, hrs. | Method of analysis [2] |
| 2 | Chlorine [3] | 1.2 | HOAc | 0.5 | KOAc | [4] 4.0 | | | Room | 22 | TLC. |
| 3 | do | 2.6 | HOAc | 0.2 | | | | | do | 16 | VPC. |
| 4 | do | 1.2 | HCO$_2$H | 0.2 | NaO$_2$CH | [4] 4.0 | | | do | 60 | VPC. |
| 5 | do | 1.2 | CCl$_4$ | 091 | K$_2$CO$_3$ | [4] 2.5 | | | do | 160 | TLC. |
| 6 | do | 1.5 | CHCl$_3$ | 0.2 | Et$_3$N | 1.8 | | | do | 120 | VPC. |
| 7 | t-Butyl hypochlorite | 1.5 | CCl$_4$ | 0.1 | | | | | Reflux | 16 | VPC. |
| 8 | N-chloro succinimide | 1.1 | CCl$_4$ | 0.1 | | Yes | | 1 | do | 16 | Preparative TLC/NMR.[5] |
| 9 | do | 1.1 | CCl$_4$ | 0.1 | | Yes | | 1 | do | 16 | VPC. |
| 10 | do | 1.1 | CH$_2$Cl$_2$ | 0.1 | | Yes | | 1 | do | 21 | VPC. |
| 11 | do | 1.1 | CH$_2$Cl$_2$ | 0.1 | | | | | do | 21 | VPC.[6] |
| 12 | do | 2.1 | CH$_2$Cl$_2$ | 0.1 | | | | | do | 16 | VPC. |
| 13 | do | 2.0 | CCl$_4$ | 0.1 | | Yes | | 1 | do | 16 | TLC. |
| 14 | do | 6.0 | CH$_2$Cl$_2$ | 0.1 | | | | | do | 20 | VPC. |

[1] Free radical catalyst=2,2'-azobis(2-methylpropionitrile).
[2] TLC=thin layer chromatography, VPC=vapor phase chromatography, NMR=nuclear magnetic resonance spectroscopy.
[3] Freshly standardized (iodide-thiosulfate) before each use.
[4] Solid suspension.
[5] Small sample collected by preparative VPC and identified by mixture M.P.
[6] Identified by infrared and mixture M.P.

We claim:
1. A process for the preparation of a compound of the formula

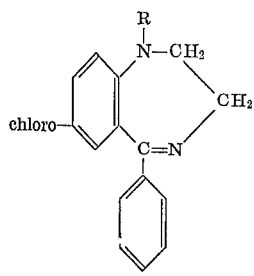

wherein R is lower alkyl
from the corresponding compound of the formula

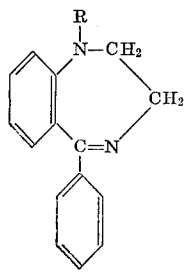

wherein R is as above
by chlorinating in the presence of an inert organic solvent, the compound of the Formula II above with a chlorinating agent selected from the group consisting of chlorine, a lower alkyl hypochlorite and a chlorinating agent containing a

group selected from the group consisting of a compound of the formula

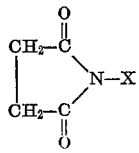

a compound of the formula

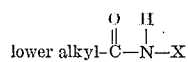

and a compound of the formula

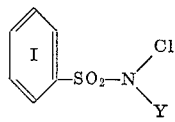

wherein X is chloro, I connotes unsubstitution or substitution with lower alkyl and Y is selected from the group consisting of hydrogen and lower alkyl.
2. A process as defined in claim 1 wherein R is methyl.
3. A process as defined in claim 1 wherein the chlorinating agent is selected from the group consisting of chlorine, a lower alkyl hypochlorite and N-chlorosuccinimide.
4. A process as in claim 3 wherein R is methyl.
5. A process as defined in claim 2 wherein the chlorinating agent utilized is N-chlorosuccinimide.
6. A process as defined in claim 5 wherein a free radical catalyst is present.
7. A process as defined in claim 6 wherein the free radical catalyst utilized is 2,2'-azobis(2-methylpropionitrile).

References Cited
UNITED STATES PATENTS
3,121,075  2/1964  Keller et al. ---------- 260—239

OTHER REFERENCES
Morrison et al.: Organic Chemistry (1959), p. 287.
Wagner et al.: Synthetic Organic Chemistry (1953), pp. 98–99.

ALEX MAZEL, Primary Examiner
J. A. NARCAVAGE, Assistant Examiner

U.S. Cl. X.R.
260—694, 999